(12) United States Patent
Henningsen

(10) Patent No.: US 7,903,049 B2
(45) Date of Patent: Mar. 8, 2011

(54) APPARATUS AND A METHOD FOR ILLUMINATING A LIGHT-SENSITIVE MEDIUM

(75) Inventor: Henning Henningsen, Låsby (DK)

(73) Assignee: Dicon A/S (DK)

( * ) Notice: Subject to any disclaimer, the term of this patent is extended or adjusted under 35 U.S.C. 154(b) by 306 days.

(21) Appl. No.: 12/100,930

(22) Filed: Apr. 10, 2008

(65) Prior Publication Data

US 2008/0259228 A1    Oct. 23, 2008

Related U.S. Application Data

(63) Continuation of application No. 09/402,751, filed as application No. PCT/DK98/00154 on Apr. 14, 1998, now abandoned.

(30) Foreign Application Priority Data

Apr. 14, 1997   (DK) ............................................ 41597
Jan. 16, 1998   (DK) ............................................. 6398

(51) Int. Cl.
    *G09G 3/00*        (2006.01)

(52) U.S. Cl. ................................ 345/32; 345/84; 345/87

(58) Field of Classification Search ............... 345/31, 345/32, 55, 82, 83, 86, 87, 94, 84, 204; 362/551–561; 355/18, 67; 349/2–5, 8–10; 340/815.45, 815.47; 353/82
See application file for complete search history.

(56) References Cited

U.S. PATENT DOCUMENTS

| 3,553,364 | A | * | 1/1971 | Lee ................................. 359/230 |
| 4,651,148 | A | * | 3/1987 | Takeda et al. ..................... 345/94 |
| 4,934,773 | A | * | 6/1990 | Becker ............................... 345/83 |
| 5,281,960 | A | * | 1/1994 | Dwyer, III ........................ 345/31 |
| 5,548,349 | A | * | 8/1996 | Mizuguchi et al. ............ 348/766 |
| 5,765,934 | A | * | 6/1998 | Okamori et al. ................ 353/38 |
| 5,868,480 | A | * | 2/1999 | Zeinali .............................. 345/32 |

FOREIGN PATENT DOCUMENTS

WO      WO 98/47048      10/1998

* cited by examiner

*Primary Examiner* — Regina Liang
(74) *Attorney, Agent, or Firm* — Cantor Colburn LLP

(57) ABSTRACT

The invention relates to an illumination unit for point illumination of a medium comprising a plurality of light emitters in the form of light guides, which are arranged to illuminate at least one illumination face via a light valve arrangement, said light valve arrangement comprising a plurality of electrically controlled light valves, at least one of the light emitters (1) being arranged to illuminate a plurality of light valves.

15 Claims, 3 Drawing Sheets

APPARATUS AND A METHOD FOR ILLUMINATING A LIGHT-SENSITIVE MEDIUM

CROSS REFERENCE TO RELATED APPLICATION

This application is a continuation of and claims the benefit of U.S. patent application Ser. No. 09/402,751 filed on 12 Oct. 1999, the contents of which are herein incorporated by reference in their entirety.

TECHNICAL FIELD

The invention relates to an illumination unit and a method of point illumination of a medium comprising a plurality of light emitters in the form of light guides which are arranged to illuminate at least one illumination face via a light valve arrangement, said light valve arrangement comprising a plurality of electrically controlled light valves.

BACKGROUND

The art comprises various types of illumination systems of the type where a continuous high power light source, e.g. an Hg or Xe lamp, illuminates a plurality of illumination points on a light-sensitive medium via a given type of light modulators.

However, the technology has not been a great commercial success, because many light valve types have a very low coefficient of utilization, and, accordingly, distribution of light over a large illumination face will typically give greater optical losses and thereby cause the emitted optical power on the illumination point to be reduced considerably. As a result of this circumstance, the available optical energy will frequently tend to be concentrated in one specific small illumination area, rather than trying to distribute it over a large area for an extended period of time because of the limited illumination power and thereby achieve a reduced illumination power over the individual illumination points.

A drawback of this prior art caused by the above-mentioned problems is that it is necessary to place a very large number of light valves in a light valve array on a very small area, as it is very difficult to distribute sufficient optical power over a large area, and also difficult to achieve a uniform surface illumination.

Computer to plate technology, which is known e.g. from U.S. Pat. No. 5,049,901 in which e.g. printing plates are illuminated via DMD light valves, involves the problem that it is not possible to have sufficient optical power distributed over a large area. The patent thus describes how illumination on a scanning line is maintained as best as possible for the longest possible period of time by illuminating the same scanning line with several rows of light valves. Another consequence of the relatively low illumination power may also be that special printing plates having an increased light sensitivity have to be used, which for one thing are expensive in use and for another make greater requirements with respect to storage and use than the conventional printing plates. A further possible consequence of this relatively low achievable optical energy is that the illumination time of the system must be increased considerably. This increase in time consumption, however, is not very expedient as the overall necessary exposure time for a printing plate is increased considerably.

A further drawback of optical distribution over a large area is that the use of e.g. a large number of light sources may give rise to rather pronounced edge problems which occur at the boundary areas between the illumination profiles and the illumination area of the individual light sources. These edge problems have previously been avoided either by illuminating an illumination area with the same light emitter, or alternatively by illuminating each individual illumination point with a separate optical fibre. Systems of the first-mentioned type, which are known from U.S. Pat. No. 4,675,702, have the drawback that the illumination area is restricted physically, thereby calling for a complicated relative mechanical movement between the illumination unit and the substrate.

The last-mentioned type provides a uniform illumination on the illumination face, as the illumination intensity varies between each illumination point so that the variation of the illumination intensity is not visible. A drawback of the last-mentioned type, which is known from U.S. Pat. No. 4,899,222, is that the system is extremely complicated, as an optical fibre is required for each illumination point. This means that the light distribution from the light source to the light modulators requires the use of a very large number of optical fibres, and that a very precise adjustment of each individual optical fibre is required with respect to the light source as well as the light modulators. It should be recalled in this connection that each individual optical fibre must be re-adjusted by routine exchange of light source.

The above-mentioned light modulator systems are additionally vitiated by the drawback that the transmission attenuation is very high, whereby high power illumination on the medium to be illuminated is extremely difficult or downright impossible.

BRIEF SUMMARY

When at least two of the light emitters are arranged to illuminate a plurality of light valves each, it is possible to achieve a very high transmitted illumination intensity combined with a very even and uniform surface illumination.

The prior art does not involve a decided, effective specific distribution from more than one light emitter over a large area or subarea of light valves. When light is distributed via several light emitters, each of which illuminates a plurality of light valves, it is also possible to use several light sources in a simple manner, and each said light source may be dedicated to precisely one light guide so that the power achieved has a maximum value.

A further advantage of distributing light by means of light guides is that light may suitably be mixed in couplers or the like to achieve a greater sum of transmitted power in the individual light guides.

A further advantage of the invention is that it gradually becomes possible to achieve increased input powers from e.g. lamps in the W range, so that the power transmitted to the light valves will be so great that the individual light emitters can emit light having a sufficiently great energy to illuminate several light valves at the same time.

It has also been found in connection with the use of e.g. W lamps that the introduction of macro illumination areas, i.e. each area illuminated by a single light guide, gives no significant edge effects between each illumination area, just as it has been found that any great variations between the emitted powers from each light guide (as a function of a varying intensity profile from a connected lamp e.g. because of different positioning of the coupling optics for the individual fibres with respect to the lamp) may be compensated by suitable mixing of the light guides, whereby the result of the complete illumination has a uniform visual appearance without significant differences in intensity in the edge areas.

The above-mentioned mixing may e.g. be performed in consideration of the circumstance that adjacent macro illumination areas receive optical power which does not differ significantly from each other, while macro illumination areas oriented relatively remotely from each other may have a somewhat greater difference in intensity, without this causing considerable visual disturbances on the illumination surface.

An additional advantage of the invention may be obtained by filtering the light to or emitted from the individual light guides, so that the illumination intensity is uniform from all the light guides or some of these.

In contrast to the prior art, an apparatus according to the invention may be constructed in a relatively simple manner, while achieving high resolution, high illumination rate, good precision and uniform illumination intensity over a very large illumination area.

The invention is particularly advantageous in connection with light valves which are vitiated by relatively great losses. An example of such light valve types may e.g. be electrooptically based light valves, such as LCD, PDLC, PLZT, FELCD and Kerr cells. Other types of light valves may e.g. be electromechanical reflection-based light modulators of the DMD type.

According to the invention, it is thus possible to sum light over a large surface in a simple manner using relatively few light guides, just as it is possible to orient the light emitters in the illumination system relatively freely as the light emitters including light guide ends rather than e.g. a light source with associated optical system, drivers and coolants.

A particularly advantageous embodiment of the invention is achieved for transmissive light valves, as these result in the fewest possible optical losses, which may be quite decisive for the functionality of certain applications.

When the illumination unit additionally comprises a first lens arrangement, said lens arrangement comprising at least one micro lens arranged with respect to each light valve so that the light emitted by the light emitter or emitters is focused on or in the vicinity of the optical axis of the individual light valves, a high utilization of the light power emitted from the light emitter is achieved.

When the illumination arrangement additionally comprises a second micro lens arrangement arranged between the light valves and the illumination face, so that light transmitted through the light channel of the individual light valve is focused suitably on the illumination surface, it is ensured that the light from each channel falls on small points with high intensity on the illumination surface.

When the optical light guide or guides are formed by optical fibres, a small loss of light intensity as well as great constructional flexibility in the spatial positioning of the individual elements is achieved.

The use of multimode fibres opens up the possibility of illuminating the illumination surface with more broadspectral light.

When at least one of the light sources is formed by a short arc gap lamp, a high emitted light power is achieved from an area of limited physical extent (high radiation intensity).

When the light source comprises a short arc gap lamp having light receiving optical light guides or fibres which are arranged within an angle of +/75" with respect to the equator axis (E) of the lamp on a ball face around the lamp, and which are optically connected to and conduct light to the light emitters, it is ensured that the predominant part of the light emitted from the light source is gathered in the light guides, whereby the coefficient of utilization is very high.

When at least one of the light sources is formed by a laser source, it is possible to distribute the light sources so that e.g. a row of laser sources can supply the total number of light valves.

When the illumination unit comprises a plurality of light emitters in the form of light guides, each of which is optically connected to a light source arranged to illuminate a plurality of light valves arranged in a given face shape, at least one collimation lens being arranged between the light emitter and the face shape so that collimated light is conducted to a first micro lens arrangement associated with the plurality of light valves, a homogeneous illumination of a plurality of the light valves from each light emitter is achieved.

When the face shape of the light valves forms a hexagon, a good approximation to a circle and thereby a high utilization of the light energy from a light emitter of circular geometry are achieved. Another advantage is that hexagonal illumination faces are extremely advantageous to use in connection with scanning movements of a plurality of illumination units built together. Thus, hexagons may suitably be shaped and positioned mutually offset in and transversely to the scanning direction.

When the individual light valves are arranged in rows in the transverse direction of the face shape with the light valves at a given mutual distance, said rows being mutually offset in the transverse direction, it is possible to distribute the light linearly over a great width.

When the rows are arranged such that the projection of all the individual light valves in the transverse direction in the face shape results in a plurality of illumination points at a mutual distance in the transverse direction, it is ensured that light may fall on points with a considerably higher resolution than corresponding to the distance between the individual light valves because of their physical extent if these were positioned in a single row in the transverse direction.

When the face shape or shapes of the light valves are arranged on one or more illumination heads, each illumination head and the illumination face being adapted to perform a relative movement across an illumination area, said device being also provided with a control unit for controlling the light valves in dependence on the relative movement between the illumination head and the illumination face, an advantageous embodiment of the invention is achieved.

When the illumination head or heads are arranged as a rod whose relative movement with the illumination face is a simple progressing movement in the transverse direction of the rod, it is ensured that illuminated points may be generated in the entire or a considerable part of the width of the illumination face and by virtue of the scanning movement on the entire or a considerable part of the illumination face.

When the illumination unit between the light valve arrangement and the illumination face additionally comprises optical means for spreading the light beams emitted by the light channels across the illustration face, exposure is ensured over an area which is physically larger than the area covered by the light channels, thereby e.g. allowing compensation for non-active edge areas around a light valve arrangement.

When the light valves of the illumination unit are formed by electrooptically based light valves (spatial light modulators), such as LCD, PDLC, PLZT, FELCD or Kerr cells, a great design flexibility is achieved with respect to selection of light modulator principle in the individual application, including also that standardized components can reduce the production price.

When the light valves of the illumination unit are formed by reflection based electromechanical light valves, such as DMD chips, a solution with high spatial resolution is achieved.

When the light valves of the illumination unit are formed by transmission based electromechanical light valves, a solution with a very low dimming of light through the modulator is achieved.

When the light guides of the illumination device are so arranged with respect to the light valve arrangement that the optical energy fed to each subset of light valves does not differ significantly from each other when the subsets of light valves illuminate adjacent areas or areas close to each other on the illumination face, it is ensured that the permissible variation in light intensity between all light emitters may be increased without this becoming visible.

When the light receiving ends of the light guides are gathered in at least one bundle which directly or indirectly receives light from a reflector or a reflector system optically connected to at least one lamp, a better possibility of centrally controlling both amount and variation of the light injected into the light guide is achieved.

BRIEF DESCRIPTION OF THE DRAWINGS

The invention will be explained more fully below with reference to the drawings, in which.

DETAILED DESCRIPTION

Figure 1:
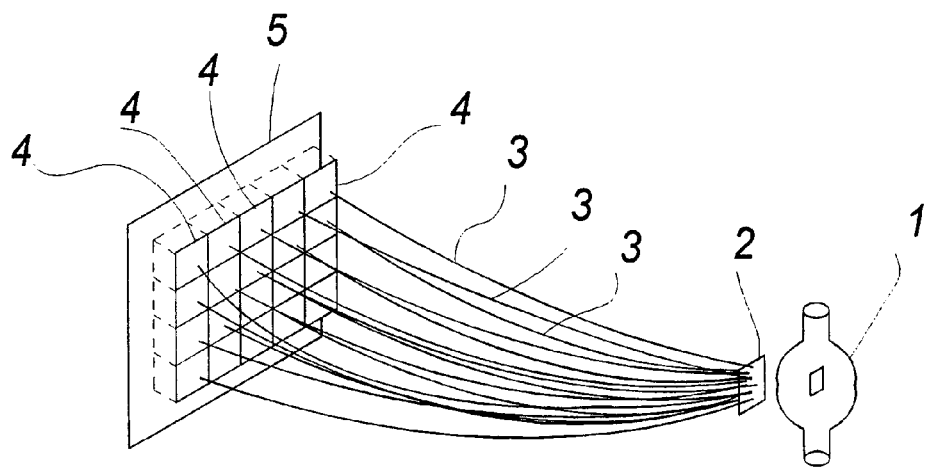
FIG. 1 shows a basic sketch of an embodiment of the invention.

FIG. 1 shows a basic sketch of an embodiment of the invention.

Thus, an illumination system comprises a lamp 1 which is optically connected with a plurality of light receiving ends of light guides, such as optical fibres 3 which are gathered in a fixture 2.

At the opposite end of the optical fibres 3, the optical fibres 3 are optically connected to a plurality of subareas or zones 4, each of which comprises a plurality of light valves (not shown).

The light guides 3 thus conduct light to the subareas 4 where the fed light is modulated on an illumination face 5.

The light valve arrangement shown in FIG. 1 may e.g. be arranged for flash exposure, i.e. all illumination points on the complete illumination face may be illuminated at the same time.

The light valve arrangement shown in FIG. 1 may moreover be constructed on the basis of an array having a very large number of light valves, the total area being divided into a plurality of subareas which each are illuminated by a light guide 3.

Figure 2:
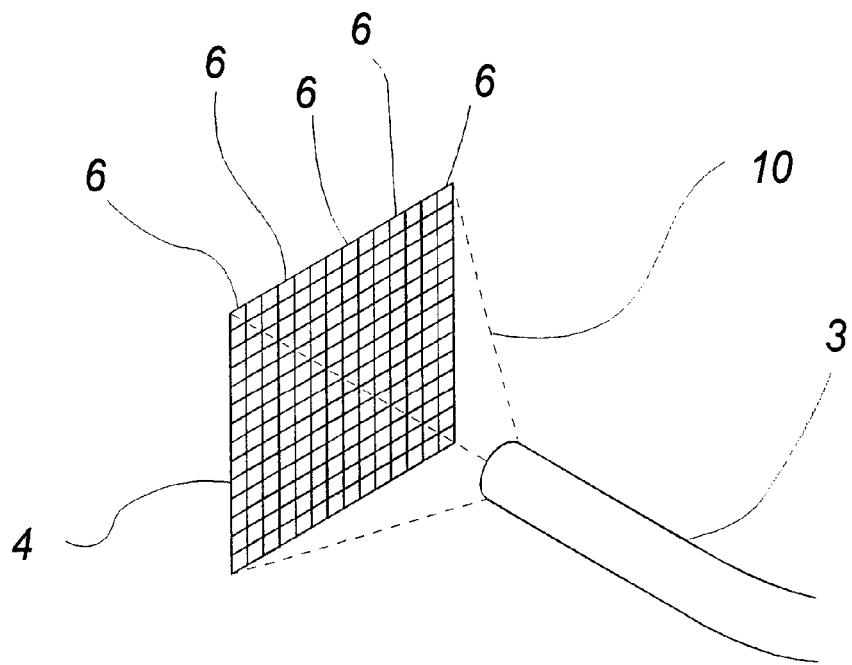
FIG. 2 shows a more detailed sketch of a subarea shown in FIG. 1.

FIG. 2 is a close-up of one of the subareas 4 shown in FIG. 1.

Each subarea comprises a plurality of light valves 6 which may individually be controlled electrically by a control unit (not shown) connected to it. The light valve arrangement may e.g. be formed by an LCD display with a given desired resolution.

The entire subarea of light valves 4 is illuminated by one light guide 3 so arranged that a light beam 10, emitted from the light guide 3, can supply optical energy to all the light valves 6 in the subarea.

It should be noted that the light beam will frequently be supplied through collimation optics so that the light beam supplied to the light valve arrangement is plane and uniform in terms of energy.

Figure 3:
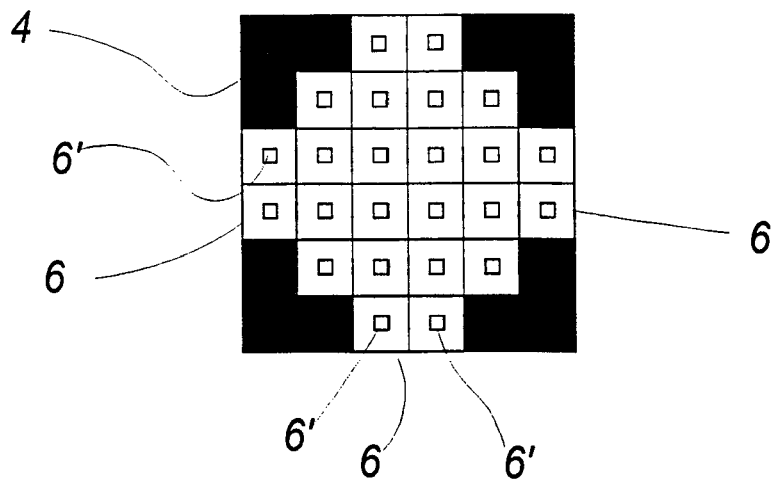
FIG. 3 shows an additional example of an embodiment of a subarea according to the invention.

FIG. 3 shows a further example of an embodiment of a subarea according to the invention.

With respect to the subarea shown in FIG. 2, it is noted initially that there are fewer light valves in each subarea.

The shown subarea 4 thus comprises a plurality of light valves 6 with light valve apertures 6'.

It will be seen that the selected light valve arrangement has had the light valves at the corner diaphragmed so that the shape of the subarea approximates a circumcircle. It will be appreciated that, for explanatory reasons, the selected example has a reduced number of light valves, and a larger number of light valves can therefore be approximated more easily to a desired face-shaped or matrix structure.

An advantage of an approximately circular face shape is that it is relatively easy to distribute light over the light valve arrangement from a light guide, as a light guide will typically have a circular cross-section.

Figure 4:
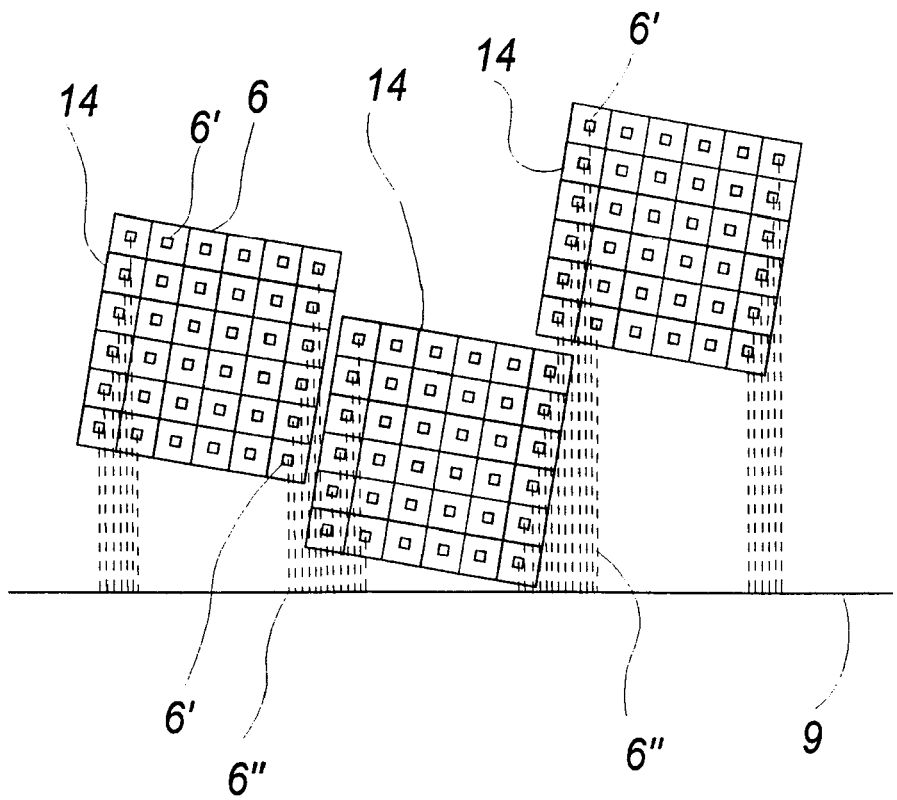
FIG. 4 shows an embodiment in which the subareas shown in FIG. 3 are arranged on e.g. a scanning rod.

It will be seen from FIG. 4 how three subareas 14 of light valves 6, 6' are arranged as cooperating illumination units for performing a scanning movement and illumination perpendicularly to a scanning line 9. In the shown projection of light on the scanning line 9 the complete light valve arrangement moves perpendicularly to the scanning line 9 and performs illumination in the normal direction of the units. As will appear, the light aperture 6' of the individual light valves 6 gives a contribution on the scanning line with equidistant illumination points in the form of an illumination point 6".

The shown arrangement may e.g. be constructed on a movable scanning rod (not shown) with associated control electronics (not shown).

The shown structure may be built more economically than e.g. arrangements for flash exposure, just as it will be possible to increase the resolution in a simple manner.

This will be discussed in greater detail below.

As will appear from the example, the subareas used have an inclination with respect to their projection on the scanning line 9. The shown arrangement thus gives an increase in the resolution which corresponds to the number of rows in the light valve arrangement. The angle with respect to the scanning line 9 of each illumination module is adapted so as to create an equidistant spacing between the points 6" projected down on the line 9.

As an alternative to the arrangement described above, the system may be arranged with redundancy by allowing several light valves to illuminate the same illumination point. This may e.g. be a distinct advantage in connection with light valve types in which a certain functional uncertainty occurs, i.e. non-functioning mirrors or valves. Such a redundancy may e.g. be achieved by rotating a larger array of light valves so that selected light valves, when scanning past an illumination face or scanning line, illuminate the same point.

It should be recalled in this connection that generally a very small or no percentage of error must be accepted for the light valves involved if these are used as "stand alone", for which reason redundancy will allow some uncertainty on the individual illumination modules. This in turn reduces the unit price of the light valve units involved.

An advantage of the shown example is that standard light valve structures may be used with an ordinary matrix position of the light valves, such as e.g. light valves of the LCD type, rather than having to produce subareas with a particular and specific layout.

However, it will be appreciated that the individual subareas or the complete light valve arrangement, if so desired, may be produced in one total formation of light valves in a given specific layout.

It should moreover be noted that a further advantage of the invention is particularly pronounced when using a scanning light valve arrangement, as the light valve arrangement in its entirety normally requires a very elongated light supply line (corresponding to the length of the desired scanning line). Such an elongated light profile may be extremely difficult to achieve without using light guides, as the optics used may be extremely complicated and bulky.

Figure 5:
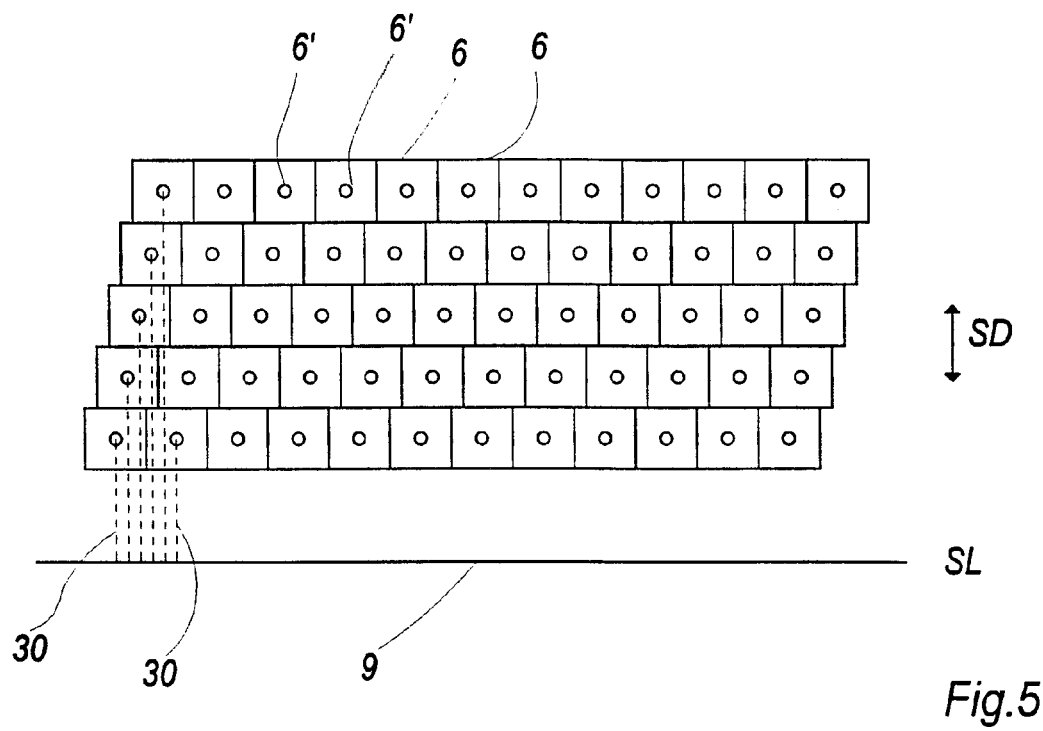
FIG. 5 shows an embodiment with a plurality of illumination modules arranged on a scanning rod.

FIG. 5 shows a section of a further embodiment of the invention, the light valve layout being produced directly in this case with row displacement between the individual light valve rows.

The light valve arrangement shown is adapted to scan across an illumination face in the scanning direction SD.

The light valve arrangement is arranged with a plurality of light valves 6 positioned in rows, e.g. LCD light valves. Each light valve has an illumination aperture 6' which is electrically activatable and deactivatable. When the light valve 6 is open, it will thus illuminate an illumination place arranged below the light valve. This illumination place will be a scanning line 9 in the shown case.

As shown in the drawing, the light valve arrangement projections 30 together form an illumination line SL on which the illumination points have a mutual given centre distance. The projections illustrate how the individual points are generated when the individual light valves pass the scanning line SL in the direction SD.

It will be appreciated that the illumination arrangement is controlled by control means (not shown) which ensure that the individual light valves open with a suitable mutual time delay so that an ordinary scanning line is reformed on the scanning line SL, even though the passage of the light valve rows across the scanning line is temporally staggered.

In the shown case the illumination resolution achieved corresponds to the mutual shifting between each adjacent row. However, it will be appreciated that the layout shown just represents one of many conceivable light valve layouts within the scope of the invention.

An advantage of the shown embodiment is that the light valve arrangement may be produced directly and specifically for the task for which the device might be intended, thereby facilitating the mutual positioning of cooperating illumination modules.

Figure 6:
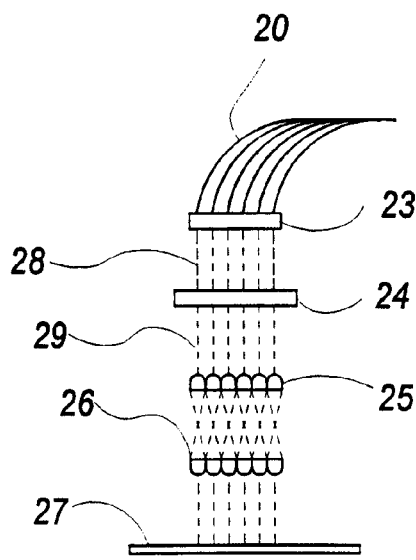
FIG. 6 shows a cross-section of an illumination system according to the invention with LCD light valves.

FIG. 6 shows a cross-section of an embodiment according to the invention.

FIG. 6 thus shows an illumination system comprising a bundle of light guides 20 whose light receiving ends may be arranged to receive light from one or more light sources (not shown).

The light guide bundle 20, which may e.g. be composed of optical fibres, forms a plurality of light emitters arranged to illuminate collimation optics 23 so that each light emitter in the fibre bundle is collimated individually to collimated light beams 28.

The collimated light beams 28 are subsequently conducted to an LCD modulation board 24 consisting of one LCD array, in which the individual LCD light valves are adapted to modulate the incident light in dependence on electrical control signals to outgoing macro light beams 29 of micro light beams. Each macro light beam 29 consists of a plurality of individually modulated micro light beams.

The micro light beams are not shown in FIG. 6 owing to the resolution achievable in the figure.

As an alternative embodiment of the invention the LCD board might be constructed as a plurality of LCD arrays which each are illuminated by precisely one light emitter or a subset of light emitters from the fibre bundle 20.

Subsequently, the macro light beams 29 are conducted to a plurality of macro objective systems which each may be composed of e.g. associated macro lenses 25, 26. The macro objective systems subsequently conduct the macro light beams to an illumination point in the form of e.g. a printing plate.

The shown embodiment can perform stationary flash exposures of stationary illumination faces depending on the structure and dimensioning of the optical system and the LCD board.

Alternatively, the shown embodiment may be arranged for relative movement between the illumination face and the illumination system in the form of e.g. a scanning, as shown in FIG. 4 and FIG. 5.

The invention claimed is:

1. A system for illumination of a light sensitive medium comprising:
    means for patterning each of a plurality of beams using an illumination unit,
    said means for patterning comprising at least one illumination head and a controller, the illumination head comprising at least two spatial light modulators of individually controllable light valves;
    the illumination head scanning the light sensitive medium in a scanning direction,
    said spatial light modulators including a leading set and a trailing set of spatial light modulators,
    said controller individually controlling the individually controlled light valves of said illumination unit in dependency of the relative movement between the illumination head and the light sensitive medium;
    wherein the illumination head is in relative movement with the light sensitive medium.

2. A system for illumination of a light sensitive medium according to claim 1, wherein the leading and trailing sets of the spatial light modulators become trailing and leading sets of the spatial light modulators, respectively, upon a reversal of a scanning direction of the light sensitive medium.

3. A system for illumination of a light sensitive medium according to claim 1, wherein several light valves of the at least two spatial light modulators illuminate the same illumination point.

4. A system for illumination of a light sensitive medium according to claim 1, wherein said controller is controlling each individual light valve in the illumination system.

5. A system for illumination of a light sensitive medium according to claim 1, wherein said controller delays the activation of the individual light valves.

6. A system for illumination a light sensitive medium according to claim 1, wherein at least one of said spatial light modulators of light valves in the illumination system is transversely displaced compared to other spatial light modulators s of light valves in the illumination unit.

7. A system for illumination of a light sensitive medium according to claim 1, wherein said illumination head or heads constitute a rod whose relative movement with the light sensitive medium is a single progressing movement in the transverse direction of the rod.

8. A system for illumination of a light sensitive medium according to claim 1, wherein said illumination system comprises optical means between a light valve arrangement and the light sensitive medium for spreading and/or focusing and/or collimating the light beams emitted by the light channels across the light sensitive medium.

9. A system for illumination of a light sensitive medium according to claim 1, wherein the light valves of the illumination unit are formed by reflection based spatial light modulators comprising DMD (DMD: Digital Micromirror Device) chips.

10. A system for illumination of a light sensitive medium according to claim 1, wherein the light valves of the spatial light modulators system are formed by transmission based electromechanical light valves.

11. A system for illumination of a light sensitive medium according to claim 1, wherein said light valves of the illumination unit are formed by spatial light modulators comprising LCD (LCD: Liquid Crystal Display), PDLC (PDLC: Polymer-dispersed Liquid Crystal), PLZT (PLZT: lead lanthanum-dropped zirconate titanate), FELCD (FELCD: Ferroelectric Liquid Crystal Display) or Kerr cells.

12. A system for illumination of a light sensitive medium according to claim 1, wherein said illumination system comprises a plurality of light emitters in the form of light guides, each of which is optically connected to a light source arranged to illuminate a plurality of light valves arranged on the illumination head, at least one collimation lens being arranged between the light emitter and the illumination head so that collimated light is conducted to a first micro lens arrangement associated with the plurality of light valves.

13. A method for illumination of a light sensitive medium comprising:
 patterning each of a plurality of beams using an illumination unit comprising at least two spatial light modulators of individually controlled light valves,
 scanning the light sensitive medium in a scanning direction by means of the illumination unit,
 controlling the individually controlled light valves of said illumination unit in dependency of the relative movement between the illumination unit and the light sensitive medium resulting from the scanning, wherein
 the scanning of the light sensitive medium is performed by a leading and a trailing set of spatial light modulators; and
 wherein the illumination head is in relative movement with the light sensitive medium.

14. A method for illumination of a light sensitive medium according to claim 13, wherein the leading and trailing sets of the spatial light modulators become trailing and leading sets of the spatial light modulators, respectively, upon a reversal of a scanning direction of the light sensitive medium.

15. A method for illumination of a light sensitive medium according to claim 13, wherein several light valves of the at least two spatial light modulators illuminate the same illumination point.

\* \* \* \* \*